(12) United States Patent
Borissov et al.

(10) Patent No.: US 8,790,455 B2
(45) Date of Patent: Jul. 29, 2014

(54) SUPERSONIC SWIRLING SEPARATOR 2 (SUSTOR2)

(76) Inventors: Anatoli Borissov, Sugar Land, TX (US);
Geliy Mirzoev, Sugar Land, TX (US);
Vladimir Shtern, Houston, TX (US)

( * ) Notice: Subject to any disclaimer, the term of this patent is extended or adjusted under 35 U.S.C. 154(b) by 302 days.

(21) Appl. No.: 13/009,702

(22) Filed: Jan. 19, 2011

(65) Prior Publication Data
US 2012/0180668 A1 Jul. 19, 2012

(51) Int. Cl.
*B01D 51/08* (2006.01)
(52) U.S. Cl.
USPC .................................. 96/389; 95/29
(58) Field of Classification Search
CPC ...................................... B01D 51/08
USPC .................. 55/306, 315, 315.1, 315.2, 385.1, 55/385.5, 391, 392, 392.1, 394–399, 410, 55/410.1, 413–417, 421, 423–427, 434, 55/434.2, 447, 448, 451, 454, 455–458, 55/459.1–459.5, 460, 461–463, 467, 55/467.1, 471, DIG. 14, DIG. 17; 96/301, 96/302, 314, 321, 355–360, 365, 366, 96/372–379, 389
See application file for complete search history.

(56) References Cited

U.S. PATENT DOCUMENTS 6,513,345 B1 * 2/2003 Betting et al. .................. 62/637
6,524,368 B2 * 2/2003 Betting et al. ..................... 95/29
(Continued)

FOREIGN PATENT DOCUMENTS

DE           3825155      * 12/1988

OTHER PUBLICATIONS

Goldshtik, M.A. and Shtern, V.N., "Collapse in Conical Viscous Flows"; J. Fluid Mechanics, 1990, vol. 218, pp. 483-508.

(Continued)

*Primary Examiner* — Duane Smith
*Assistant Examiner* — Sonji Turner
(74) *Attorney, Agent, or Firm* — Alberto Q. Amatong, Jr.; The Amatong Law Firm, PLLC

(57) ABSTRACT

Sustor2 provides deep cooling of a gas flow, practically total condensation of a vapor, and fast and effective removal of the condensed liquid with a significantly reduced pressure losses compared with the prior art. Sustor2 performs the said operations by developing a strong swirling flow starting from its entrance, followed by spiral flow convergence in the inlet disc-like part, and then in a converging-diverging nozzle, by centrifugal removal of droplets, and removal of the liquid film through slits, then by spiral flow divergence and leaving the vortex chamber through tangential outlet.
A gas enters from a pipeline (see the arrow in the A-A cross-section shown in FIG. 7) connected to Sustor2 by a flange and the inlet transition pipe ITP in FIG. 7, spirally converged in the disc-like part, marked by A-A in FIG. 6, enters the converging-diverging nozzle (FIG. 6). The flow is high-speed and swirling even at the near-entrance region of the vortex chamber. This swirl results in the centrifugal force that presses the through-flow to the sidewall. The flow accelerates near the nozzle throat up to a supersonic velocity with subsonic axial and supersonic swirl velocity components. This acceleration results in the gas temperature drop down to 200K and even less values. The reduced temperature causes rapid condensation of vapor into droplets. The centrifugal force pushes the droplets to the sidewall where they are removed through slits. Next the dried gas spirally diverges and leaves the vortex chamber through the tangential outlet. This results in the pressure recovery and transformation of the swirl kinetic energy into the longitudinal kinetic energy of the gas. Both the effects decrease pressure losses which is the Sustor2 advantage compared with the prior art.

11 Claims, 11 Drawing Sheets

Meridional cross-section of Sustor2 separator

(56) References Cited

U.S. PATENT DOCUMENTS

| | | | |
|---|---|---|---|
| 6,776,825 B2* | 8/2004 | Betting et al. | 96/389 |
| 8,002,878 B2* | 8/2011 | Betting et al. | 95/261 |
| 8,105,422 B2* | 1/2012 | Betting et al. | 95/261 |
| 8,114,179 B2* | 2/2012 | Bloom | 55/315 |
| 8,313,547 B2* | 11/2012 | Bloom | 55/392 |
| 2002/0194988 A1* | 12/2002 | Betting et al. | 95/29 |
| 2003/0145724 A1* | 8/2003 | Betting et al. | 95/29 |
| 2005/0288516 A1* | 12/2005 | Warren | 548/248 |
| 2008/0226510 A1* | 9/2008 | Riebel et al. | 422/128 |
| 2008/0289502 A1* | 11/2008 | Betting et al. | 95/248 |
| 2009/0205488 A1* | 8/2009 | Betting et al. | 95/30 |
| 2010/0005763 A1* | 1/2010 | Bloom | 55/315.1 |
| 2010/0314788 A1* | 12/2010 | Hung et al. | 264/5 |
| 2011/0120303 A1* | 5/2011 | Bloom | 95/32 |

OTHER PUBLICATIONS

Shtern, Vladimir, Borissov, Anatoly, and Hussain, Fazle; "Vortex Sinks with Axial Flow: Solutin and Applications"; American Institute of Physics 1997; Phys. Fluids 9 (10), Oct. 1997, pp. 2941-2959.

Shtern, V., Borissov A., and Hussain, F.; "Temperature Distribution in Swirling Jets"; Int. J. Heat Mass Transfer, vol. 41, No. 16, pp. 2455-2467, 1998.

Borissov, A., Shtern, V., and Hussain, F.; "Modeling Flow and Heat Transfer in Vortex Burners" American Institute of Aeronautics and Astronautics Journal 97-1998, Jun. 29-Jul. 2, 1997; pp. 1-11.

Borissov, Anatoly and Shtern, Vladimir; "Combustion in Swirling Flows"; 16th International Colloquium of the Dynamics of Explosions and Reactive Systems; Aug. 3-8, 1997; pp. 278-281.

Shtern, V. and Borissov A.; "Nature of Counterflow and Circulation in Vortex Separators"; American Institute of Physics, 2010; pp. 22, 083601-1-083601-9.

Alfyorov, Vadim, Bagirov, Lev, Dmitriev, Leonard, Feygin, Vladimir, and Imayev, Salavat; "Supersonic Nozzle Efficiently Separates Natural Gas Components"; Oil and Gas Journal May 23, 2005; pp. 53-58.

Schinkelshoek, Peter and Epsom, Hugh D.; "Supersonic Gas Conditioning—Commercialisation of Twister™ Technology"; 87th Annual Convention, Grapevine, TX Mar. 2-5, 2008.

Okimoto, Dr. Fred T, Sibani, Salim, and Lander, Michael; "Twister Supersonic Gas Conditioning Process"; Society of Petroleum Engineers, SPE 87262, Oct. 15-18, 2000.

www.twisterbv.com/products-services/twister-supersonic-separator/how-it-works/; "How it Works".

* cited by examiner

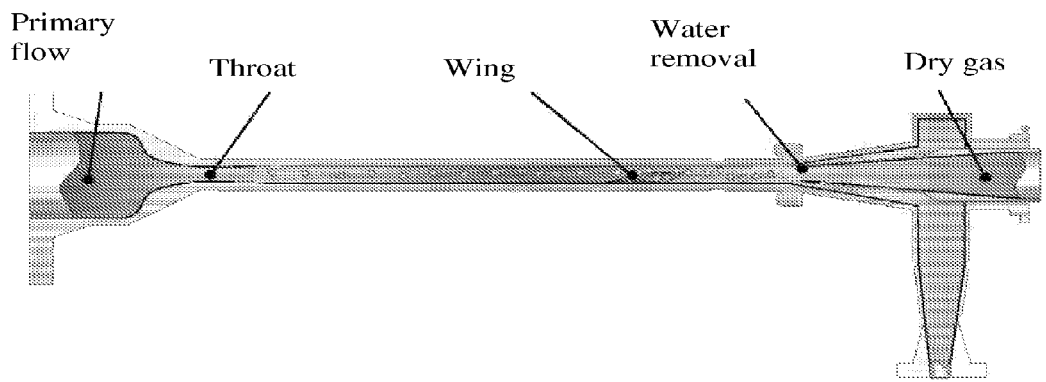
FIG. 1. Schematics of the initial Twister device
PRIOR ART

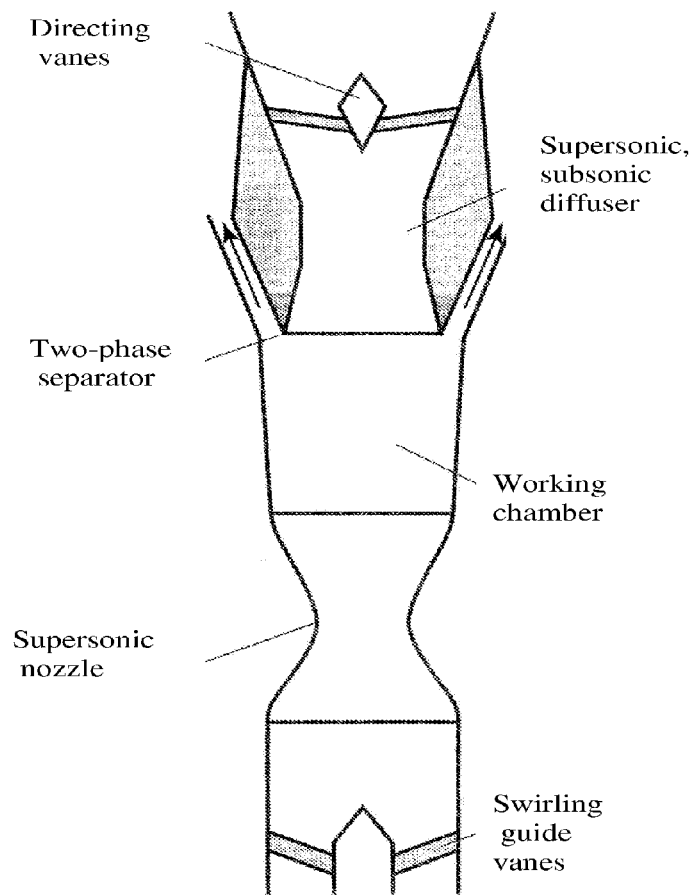
FIG. 2 Schematic of 3S devoice
PRIOR ART

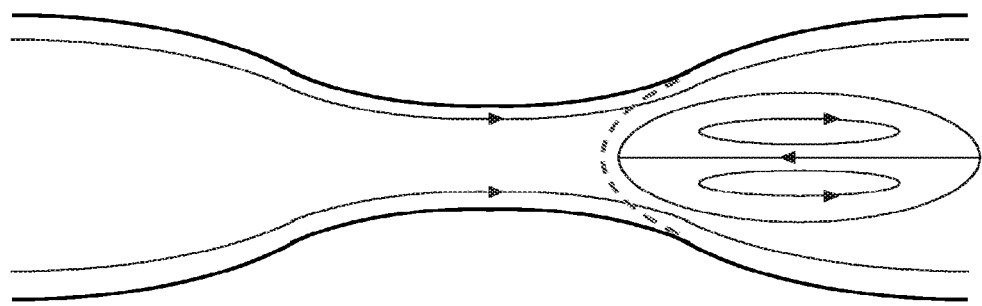
FIG. 3. Shock wave (red) developing in a swirling supersonic flow
PRIOR ART

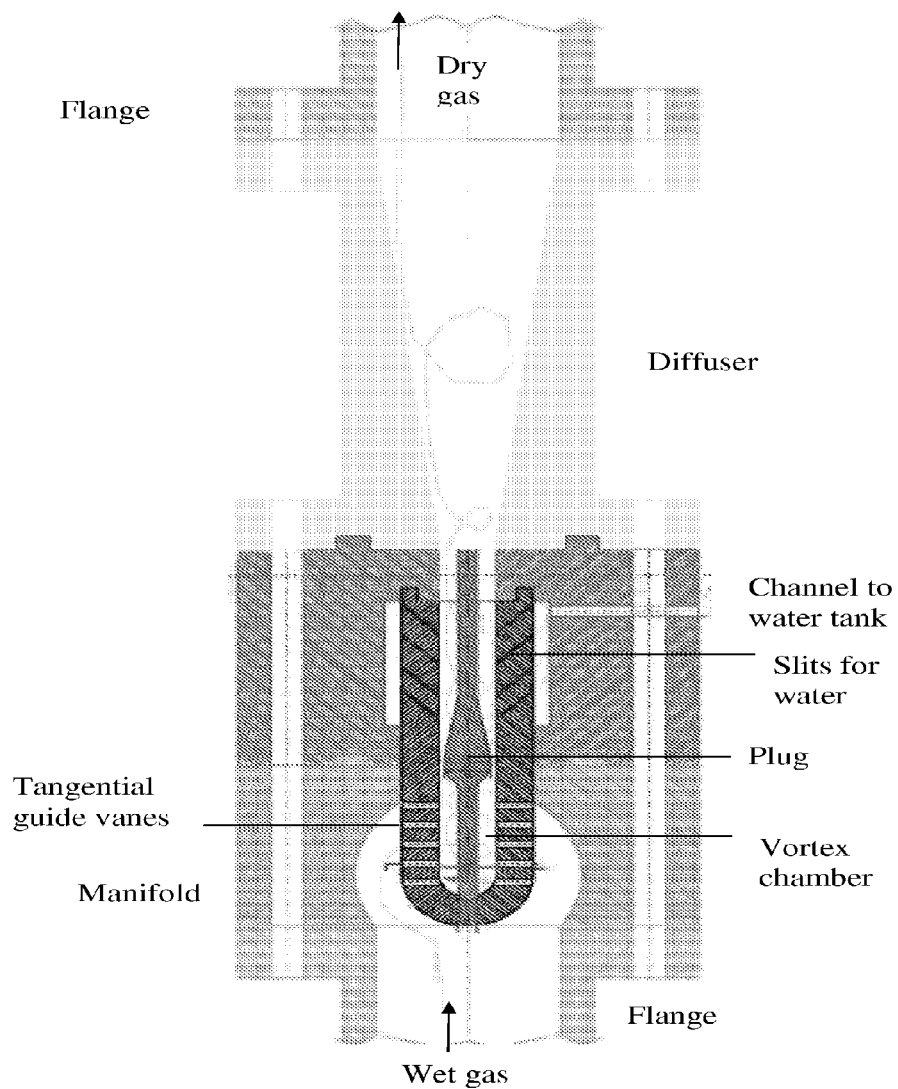
FIG. 4. Schematics of the Sustor1 device

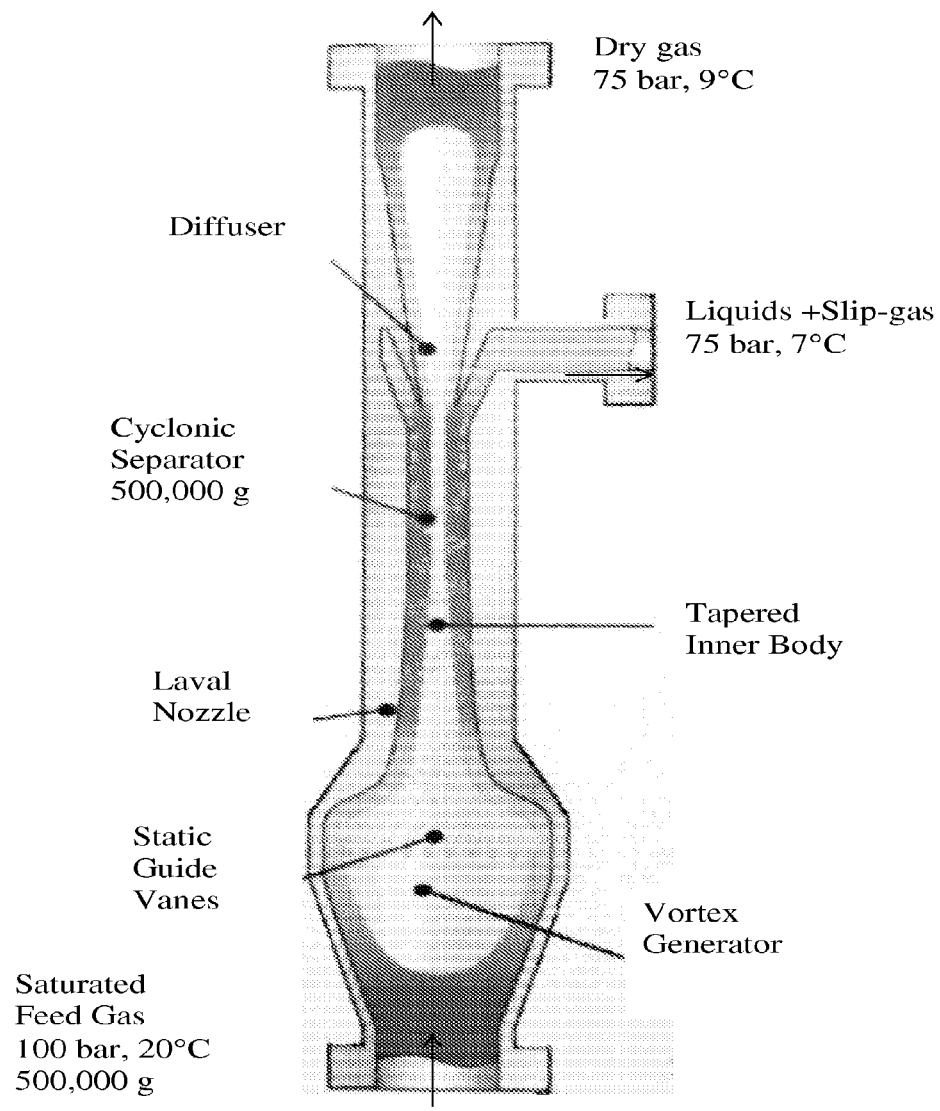
FIG. 5. Schematic of the improved Twister device
PRIOR ART

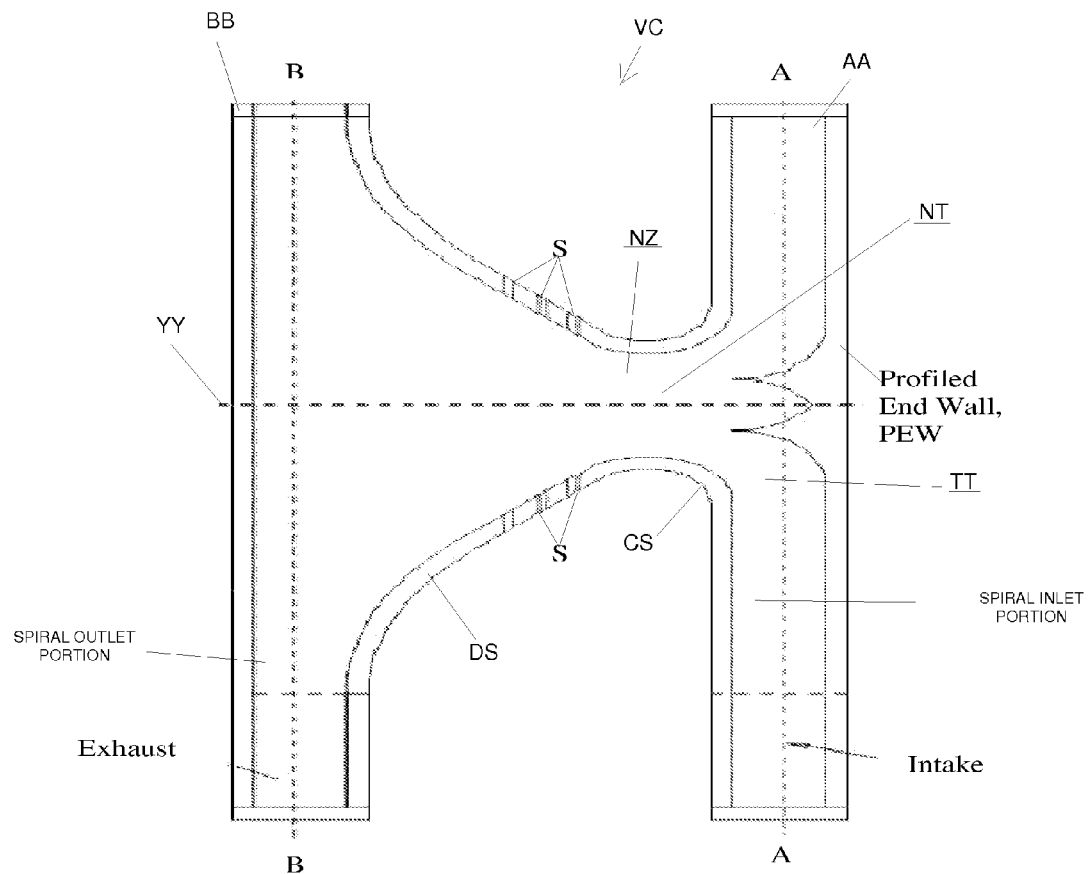
FIG. 6. Meridional cross-section of Sustor2 separator

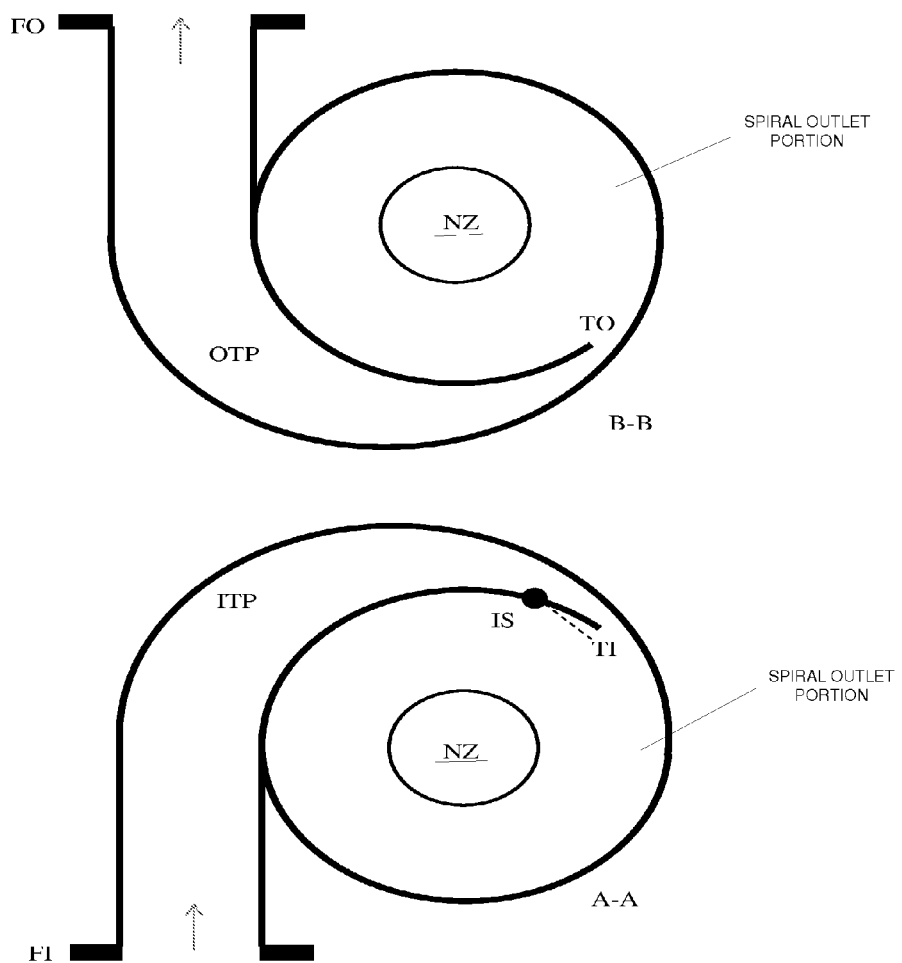
FIG. 7. Normal-to-axis cross-sections (A-A and B-B, see Fig. 6) of Sustor2 separator

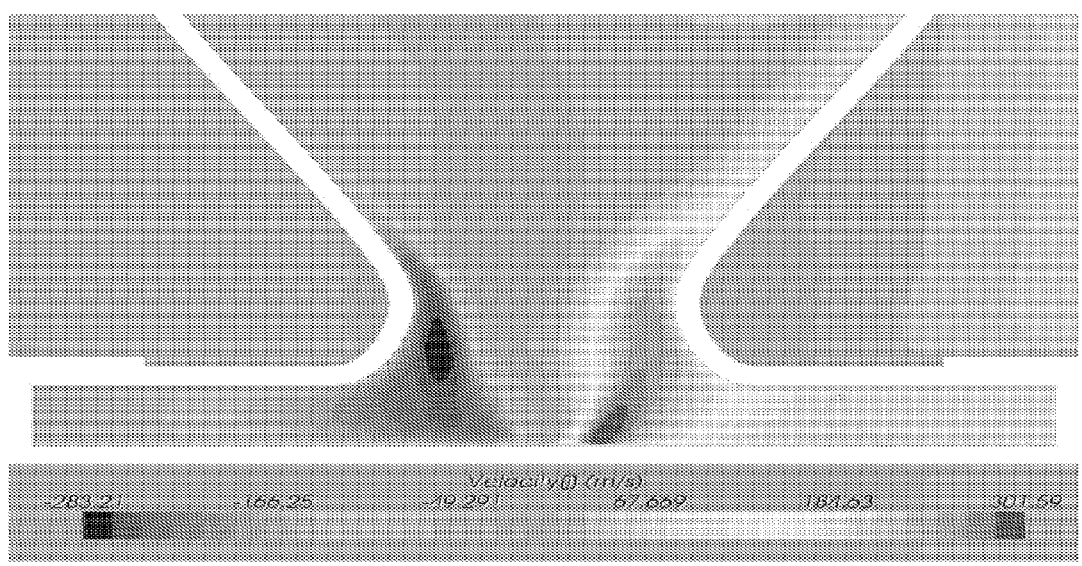
FIG. 8. Distribution of swirl velocity near the nozzle throat

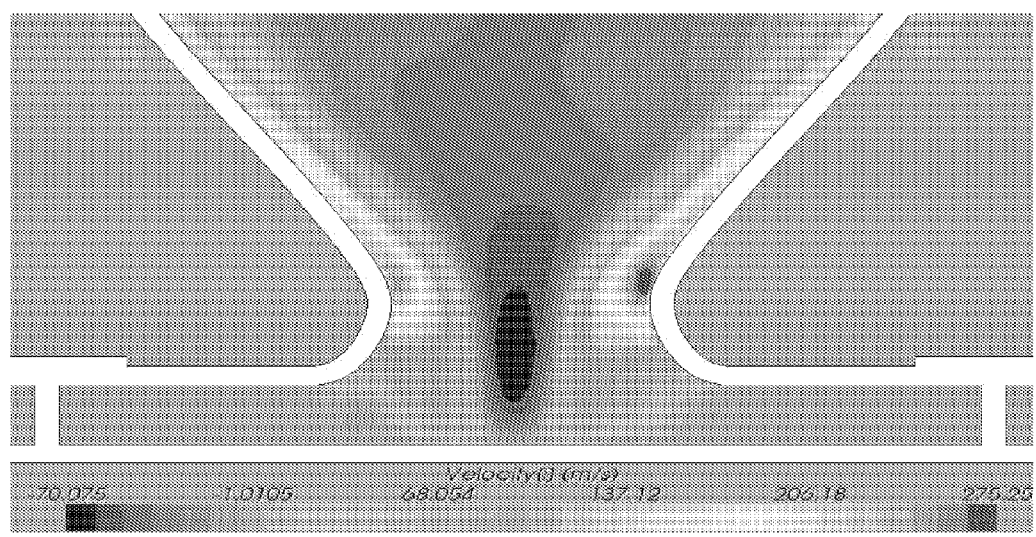
FIG. 9. Distribution of axial velocity near the nozzle throat

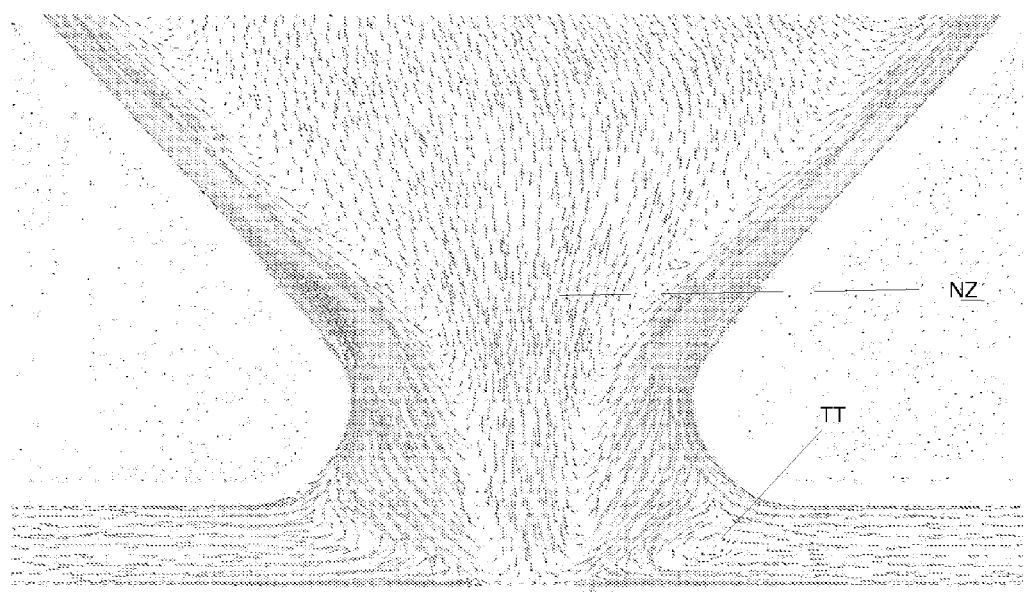
FIG. 10. Distribution of the velocity vector projected on the picture plane

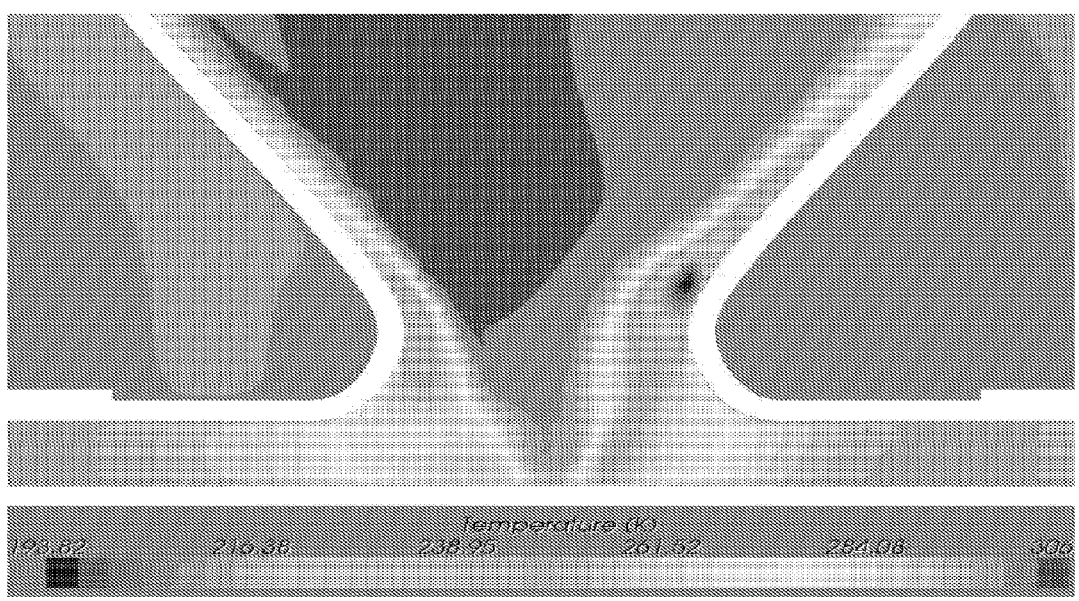
FIG. 11. Temperature distribution near the nozzle throat

SUPERSONIC SWIRLING SEPARATOR 2 (SUSTOR2)

BACKGROUND OF THE INVENTION

A. The First Twister Separator

The closest prior art is the Twister Supersonic Separator (Trade mark, February 2001, F. T. Okimoto and M. Betting, Twister supersonic separator Proceedings of the 51st Laurance Reid Gas Conditioning Conference, Norman, Okla., USA). FIG. 1 is a schematic of the original Twister device. Its key feature is that a swirl-free flow goes through a converging-diverging nozzle and becomes supersonic. In this swirl free flow, water vapor condenses into droplets due to decrease in temperature. Then this supersonic flow becomes swirling due to an embedded wing.

Serious drawbacks of this Twister device are:
1. Droplets hit the wing with a high velocity and thus eventually destroy it. The Twister authors themselves pointed out that erosion of the wing is a problem.
2. Droplets have a very small time to reach the wall under the action of centrifugal forces because the length of swirling flow is short compared with its swirl-free part. Our estimate of the residence time shows that many droplets are not separated and go with the "dry" gas in the Twister device.
3. Twister does not permit a variable gas flow rate.
4. Significant (30%) pressure losses.

B. The 3S Separator

An alternative approach is the 3S (Supersonic Swirling Separation) technology developed by a group of Russian engineers (Vadim Alfyorov et al., Supersonic nozzle efficiently separates natural gas components, Oil & Gas Journal/May 23, 2005). FIG. 2 shows a schematic of the 3S device. In contrast to the original Twister device, here a flow first becomes swirling and then supersonic. This important feature is common for the 3S and the Sustor technologies.

The crucial difference is that the 3S technology uses a standard Laval (subsonic-to supersonic) nozzle, as FIG. 2 shows, while the SUSTOR technology uses a special nozzle which allows avoid the occurrence of vortex breakdown (VB). VB is typical of swirling flows and results in the appearance of a backward flow in a region downstream of the nozzle as FIG. 3 illustrates. This VB destroys the supersonic character of the flow in the working section due to a shock wave (the red curve in FIG. 3) developing upstream of VB and deteriorating the dehydration process. This limits the application of the 3S technology to weakly swirling flows (where VB does not occur). Since swirl is weak, the centrifugal effect is small and therefore the separation of liquid droplets (resulting from condensation in the supersonic flow) is inefficient. A significant share of droplets is not removed through the peripheral slit but is transported by the near-axis flow. These droplets evaporate as the flow becomes subsonic and its temperature recovers to its ambient value. Thus the dehydration is incomplete.

BRIEF SUMMARY OF THE INVENTION

A supersonic swirling separator (Sustor2) is a device making a gas flow (1) swirling, (2) swirl focusing, (3) cold and dehydrated, (4) swirl defocusing, (5) reheated and swirl-free. The device comprises (a) a profiled manifold, (b) a tangential inlet, (c) a set of tangential guides, (d) a vortex chamber, (e) a converging-diverging nozzle, (f) a set of slits for removal of the condensed liquid, (g) a tangential outlet, and (h) inlet and outlet flanges, connecting Sustor2 to a gas pipeline. Sustor2 provides deep cooling of a gas flow, practically total condensation of a vapor, fast and effective removal of the condensed liquid, and efficient dehydration of the gas. Sustor2 can be scaled to any flow rate, can be applied at a separate gas well, has small pressure losses, and is cheap compared to the prior art separators.

Supersonic Swirling Separator 2 (Sustor2) is a new device for the continuous separation of vapors or/and gases from gas/gas mixtures. Examples are dehydration, hydrocarbon dew pointing, and separation of the different gases.

BRIEF DESCRIPTION OF SEVERAL VIEWS OF THE DRAWINGS

FIG. 1 describes Prior Art: schematics of the initial Twister device.

FIG. 2 describes Prior Art: schematics of the 3S device.

FIG. 3 describes shock wave (red) developing in the prior devices.

FIG. 4 describes schematics of the Sustor1 device.

FIG. 5 describes Prior Art: schematic of the improved Twister device.

FIG. 6 shows the meridional cross-section of Sustor2 separator.

FIG. 7 shows the cross-sections A-A and B-B (see FIG. 6) of Sustor2 separator.

FIG. 8 shows the distribution of swirl velocity near the nozzle throat of Sustor2.

FIG. 9 shows the distribution of axial velocity near the nozzle throat of Sustor2.

FIG. 10 shows the distribution of the velocity vector projected on the picture plane.

FIG. 11 shows the distribution of temperature near the nozzle throat of Sustor2.

DETAILED DESCRIPTION OF THE INVENTION

The proposed invention—Sustor2 is based on research by each of the authors as well as their collaborative research. The inventors have long-term experience and expertise in dynamics of swirling flows (e.g. see Borissov, Acta Mechanica 1990, Shtern & Goldshtik, "Collapse in swirling flows" J. Fluid Mech. 1990). They worked together a few years and published number of papers on mathematical modeling of swirling flows (Shtern et al. "Vortex-sinks with axial flow", Phys. Fluids, 1997, 9, 2941-2959; Shtern et al. "Temperature distribution in swirling jets", Int. J. Heat Mass Transfer, 1998, 41 (16), 2455-2467; Borissov et al. "Modeling flow and heat transfer in vortex burners", AIAA Journal, 1998, 36, 1665-1670; and Borissov & Shtern, "Combustion in swirling flows", Proc. 16th International Colloquium on the dynamics of explosion and reactive systems, Krakow, Poland, Aug. 3-8, 1997, 278-281). At the end of 1999, Anatoly Borissov, Geliy Mirzoev, and Vladimir Shtern started their collaborative experimental research on compressible swirling flows for applications in gas-gas, gas-liquid, and liquid-liquid separation. They developed the dehydrating apparatus Sustor1 (A. A. Borissov, G. Mirzoev, and V. N. Shtern, Provisional patent application 60/595,001, 2005). The authors' further insight in the physical mechanism of swirling flows resulted in the development of the apparatus Sustor2, which is the subject of this invention.

In contrast, the Sustor technology allows very strong swirl and intense centrifugal separation. This makes the dehydration efficient and the device to be compact.

The second serious limitation of the 3S technology is that it allows no variation of the mass flow rate because the nozzle cross-section area is fixed. Oppositely, the Sustor technology allows the variation of the mass flow rate in a wide range.

C. The Sustor1 Separator

FIG. 4 shows the first Sustor separator, Sustor1 (A. A. Borissov, G. Mirzoev, and V. N. Shtern, Provisional patent application 60/595,001, 2005). A gas enters Sustor from a pipeline connected to Sustor by a flange, turns in manifold, passes through guides, and tangentially enters vortex chamber with the central body the plug.

Thus, a swirling flow develops in the annular gap between vortex chamber and the cylindrical part of plug. The gap between the vortex chamber and plug is a profiled annular channel with a varying cross-section area. The outer and inner walls of this channel form a converging-diverging transonic nozzle.

The removal of condensed water occurs through thin slits in the peripheral sidewall (see narrow inclined channels in FIG. 4). This water is accumulated in a tank. Conical diffuser serves for pressure recovery. A flange connects diffuser with a pipeline.

A common feature of the Sustor1 and 3S devices is that the flow first becomes swirling and then supersonic. An important difference is there is the central profiled body in the Sustor1 (FIG. 4). This body makes the Laval nozzle annular that should prevent the VB development.

D. The Advanced Twister Separator

FIG. 5 shows a schematic of the advanced Twister separator (P. Chinkelshoek and H. D. Epsom, Supersonic gas conditioning—Commercialization of Twister Technology, wisterbv.com1wp--content/uploads/2008/03/twister--paper--gpa--march-2008 pdf). As FIG. 5 reveals, the improved Twister device incorporates two important features of Sustor1: (a) in contrast to the original Twister device, the improved device has the swirler located upstream of the Laval nozzle and (b) in contrast to the original Twister device, the improved device has the tapered inner body which makes the nozzle annular. This changes decrease the pressure losses. However, the losses are still large—25%.

There are two main factors causing the significant pressure losses in the advanced Twister separator. The factor 1 is the shock wave development and the factor 2 is that the swirling kinetic energy is wasted due to viscous friction downstream of the cyclonic separator.

The shock wave can develop even in a well-shaped supersonic part of the Laval nozzle because the flow is swirling. A swirling flow pattern can be very different with that of a swirl-free one. The use of the central body prevents the development of the bubble-like VB but does not exclude the flow separation. Swirl decay due to viscous friction can induce a counterflow (Borissov & Shtern, Phys. Fluids, 2010, 063601) as explained below.

The swirl-induced centrifugal force causes the radial pressure gradient: the pressure near the center of rotation is reduced compared with that at the periphery. Since swirl decays downstream, the periphery-center pressure difference also decreases. This can result in that the central pressure downstream exceeds the central pressure upstream. This axial pressure gradient can cause flow reversal not only near the axis, but also near the inner boundary of the annular channel. The reversed motion induces the flow separation from the inner boundary that in turn can result in the shock wave development. The development of the reversed flow is most probable in the diffuser (FIG. 5) because swirl rapidly decays there due to the flow divergence. The circulation region initially originating in the diffuser can then propagate upstream.

Understanding of the factors 1 and 2 is the fundamental background of the development of the Sustor2 design described below.

Accordingly, several objects and advantages of the invention are to provide an effective and complete separation of water and other species (e.g., hydrocarbon condensates) from a natural gas with relatively small pressure losses that obviates the disadvantages of prior separators.

Specifically, Sustor2 is compact in size, enabling it to be used at small gas wells, gas plants, gas storages, power plants, and so on. Sustor2 does not leave liquid components, does not release any harmful pollution, can be changed easily and conveniently for variable flow rate, pressure, and temperature. Sustor2 is a reliable, has no moving parts, requires no maintenance, and its production is simple and rather inexpensive.

Key new elements of Sustor2, substantially different from the prior art, are:

Only swirl velocity becomes supersonic while the axial and radial velocities are subsonic No shock wave develops that significantly reduces pressure losses Swirl kinetic energy is recovered that also reduces the overall pressure losses In Addition, the Advantages of Sustor2 are:
(1) the device is compact,
(2) can be scaled down for any rate of the gas flow,
(3) can be applied at a separate well
(4) no re-compression is required.

Further advantages of Sustor2 will become apparent from consideration of the ensuing description and accompanying drawings.

A key element of Sustor2 is a profiled vortex chamber which meridional cross-section is shown in FIG. 6. The chamber consists of two disc-like parts AA, BB (marked by the A-A and B-B cross-sections in FIG. 6) and the converging-diverging nozzle NZ located in between. A gas enters from a pipeline, connected to Sustor2 by the flange, Fl, shown in FIG. 7, goes through the incoming transition pipe, ITP, and enters the vortex chamber VC through the tangential inlet, TI, thus developing a swirling flow inside the vortex chamber VC. The transition pipe ITP has the circular cross-section at the flange FL Its cross-section geometry changes eventually to rectangular one to fit the tangential inlet TI, shown in FIG. 7.

The gas flow, entering the vortex chamber through TI, spirally converges from the periphery toward the chamber axis YY, being guided by the profiled sidewall and the profiled end wall, PEW, see FIG. 6, turns (TT) into the converging-diverging nozzle NZ, passes the nozzle throat NT, and then diverges, being attached to the profiled sidewall DS, CS. As the gas flow reaches the disc-like part BB, marked by B-B in FIG. 6, the flow spirally diverges, leaves the vortex chamber VC through the tangential outlet, TO, goes through the outcoming transition pipe, OTP, to the flange, FO, and comes back to the pipeline (see the B-B part of FIG. 7).

A cyclone separator can be positioned between the pipeline and the flange FI to remove solid particles and liquid droplets from the incoming gas flow.

A modification of the preferred embodiment is a controllable inlet (TI in FIG. 7). To this end, the inlet shaft, IS in FIG. 7, is used that allows the end part of the TI wall to rotate around the shaft. This would help to vary the gas flow rate while keeping the maximal swirl velocity to be supersonic, as explained below.

The flow is high-speed and swirling even at the near-entrance region of the vortex chamber. As the flow reaches the nozzle throat vicinity, its swirl velocity reaches its maximum value. To better explain the flow physics, the inventors performed numerical simulations of a turbulent flow in a simplified model of Sustor2 device. FIG. 8 depicts the swirl velocity distribution near the throat of a converging-diverging nozzle NZ. The throat diameter is 25 mm and other dimensions can be evaluated from the picture. The gas flow mass rate is 50 g/s. FIG. 8 shows the velocity which is normal to the meridional cross-section. The red (blue) color corresponds to the velocity directed to (from) a viewer. As the flow converges in the disc part of the device, the swirl velocity increases, reaches its maximum near the throat NT, and decreases downstream the throat NT.

FIG. 9 shows the axial velocity distribution and reveals two important features: (a) the through-flow forms the annular conical jet attached to the diverging part DS of the sidewall and (b) there is a strong counterflow near the axis YY which is the most high-speed near the nozzle throat NT.

FIG. 10 shows the velocity vector, projected on the picture plane, and reveals that the flow consists from the two parts: (a) narrow through-flow the near-sidewall jet and (b) circulation region which is wide downstream the nozzle throat.

The physical mechanism of the circulation is the following. The swirl-induced centrifugal force causes the radial pressure gradient: the pressure near the center of rotation is reduced compared with that at the periphery. The pressure reaches its minimum at the device axis near the nozzle throat because the centrifugal force is maximal there and diminishes as the sidewall diverges. The fluid, located in the diverging part of the nozzle, is sucked to the pressure minimum location and thus forms the near-axis counterflow. This counterflow reflects from the end wall PEW (marked by A-A in FIG. 6) and forms the meridional circulation.

The strong adiabatic expansion in the converging part CS of the nozzle cools down the gas to a very low temperature. FIG. 11 depicts the simulation results for the temperature distribution near the nozzle throat. The temperature reaches its minimum value in the jet-like through-flow slightly downstream of the throat. The simulations shows that the minimum temperature (194K) is less by a hundred Kelvin degrees than the ambient flow temperature (300K).

Since the minimum temperature is significantly smaller than the dew point value, practically entire water vapor in the gas rapidly (nearly abruptly) condenses into droplets. The centrifugal force (which is about million times gravity) immediately pushes these growing droplets toward the sidewall. The droplets accumulate in a water film on the sidewalls. The centrifugal force keeps this film stable so water droplets do not come back to the gas flow that drives the film downstream the nozzle where this water is removed from the chamber through slits, marked by S in FIG. 6.

The performed simulations correspond to the pipeline pressure exceeding the atmospheric pressure by 1 bar (this was made to match the laboratory experiment). The industrial pipeline pressure is hundred times larger than the atmospheric pressure. Accordingly, the mass flow rate through the device increases from 50 g/s up to 5 kg/s. This value is of the same order of magnitude as that for a typical gas well. To adjust to a real mass rate, a battery of Sustor2 units can be applied. An alternative is to scale the Sustor2 unit to the required flow rate.

The unit itself allows to vary the flow rate with no change in the dehydration efficiency by using the controllable inlet (TI in FIG. 7). Let the swirl velocity becomes sonic at the fixed distance, r, from the device axis while the gas flow spirally converges from TI in the A-A disc part of the separator (FIG. 7). Note that $r_c$ is close to the throat radius, $r_{tr}$.

During the rapid flow convergence, the angular momentum is nearly conserved, $\rho\, vr = const$, where $\rho$ is the gas density, v is the swirl velocity, and r is the distance from the axis. In particular, $\rho_c v_c r_c = \rho_i v_i r_i$, where the indices, c and i, mark the critical (sonic) and inlet values, respectively. This yields the inlet velocity value, $v_i = v_c\, \rho_c r_c /(\rho_i r_i)$, which is fixed for the prescribed geometry and conditions.

The gas mass rate is $M' = \rho_i v_i h_i dr_i$, where $h_i$ and $dr_i$ are the axial extent and the radial width of the tangential inlet. Since $h_i$ is fixed, $dr_i$ must vary proportionally to M': $dr_i = M'/(\rho_i v_i h_i)$. Such control variation of $dr_i$ can be made by using either manual or automatic valve. The dashed line near TI in FIG. 7 indicates a different position of the movable inner wall of the controllable inlet.

Accordingly, it can be seen that Sustor2 provides effective removal of vapor from a gas flow and has revolutionary advantages compared with the prior art. Sustor2 is reliable, durable, maintenance-free, environmentally friendly, and inexpensive device.

Although the description above contains much specificity, these should not be construed as limiting the scope of the invention but as merely providing illustrations of some of the presently preferred embodiments of this invention. Various other embodiments and ramifications are possible within its scope. Many other ramifications and variations are possible within the teachings of the invention. For example, the tangential guide vanes can be applied in addition to the coiled transition pipe; the sidewall of the converging-diverging nozzle can be differently profiled, e.g. by including a cylindrical part; location of slits for water removal can be different; and so on. Thus, the scope of the invention should be determined by the appended claims and their legal equivalents, rather than by the example given.

What is claimed:

1. A supersonic vortex-chamber separator arrangement comprising:
   an inlet;
   an outlet
   a vortex chamber positioned between the inlet and outlet and having a chamber axis, the chamber including a spiral inlet portion in direct fluid communication with the inlet at an intake end peripherally spaced from the chamber axis, a converging-diverging nozzle positioned downstream of the first spiral inlet portion and having a nozzle throat positioned centrally about the chamber axis, and a spiral outlet portion positioned downstream of the nozzle and in direct fluid communication with the outlet at an exhaust end peripherally spaced from the chamber axis; and
   wherein the vortex chamber further includes a first disc shaped part positioned about a first axial position on the chamber axis and a second disc shaped part positioned about a second axial position on the chamber axis, the first and second axial positions being spaced apart and the converging-diverging nozzle being positioned therebetween;
   wherein the spiral inlet portion is included in the first disc shaped part and is positioned about the first axial position and shaped to spirally converge gas flow about the second axial position and from the inlet toward the chamber axis and the spiral outlet portion is included in the second disc shaped part and is positioned about the first axial position shaped to spirally diverge gas flow about the second axial position outward to the outlet; and
   wherein the first disc-shaped portion is further configured such that spiral flow in the spiral inlet portion is maintained about the first axial position until a turn shaped in the first disc shaped portion directs flow away from the first axial position, toward the nozzle and along the direction of the chamber axis to directly communicate fluid flow from the spiral inlet portion to the nozzle.

2. The arrangement of claim 1, wherein the outlet is tangentially directed relative to the chamber axis.

3. The arrangement of claim 2, wherein the inlet is tangentially directed relative to the chamber axis and including a transition pipe positioned to communicate gas flow tangentially relative to the chamber axis.

4. The arrangement of claim 2, wherein the first disc shaped portion includes an end wall enclosing the spiral inlet portion and a profiled portion proximate the chamber axis shaping the turn, the profiled portion extending from the end wall such that the turn of the fluid flow at the profiled portion is directed away from the end wall.

5. The arrangement of claim 2, wherein the spiral inlet portion includes an axially directed central opening positioned about the chamber axis and in direct fluid communication with an axially converging section of the nozzle.

6. The arrangement of claim 1, wherein the vortex chamber includes an axially diverging sidewall downstream of the nozzle throat, the sidewall being equipped with a plurality of slits thereon for passing condensed liquid from the gas flow and outward from the vortex chamber.

7. The arrangement of claim 1, wherein the vortex chamber exhibits a meridional cross-section characterized by and consisting of a closed-end inlet section of the spiral inlet portion extending peripherally from the chamber axis, an axially converging section adjacent the closed-end inlet section generally exhibiting a diameter substantially reduced from a diameter of the inlet section and positioned upstream of the nozzle throat, a nozzle throat section of reduced diameter, an elongated axially diverging section downstream of and adjacent the nozzle throat, and a closed-end outlet section of the spiral outlet portion adjacent the diverging section and having a diameter generally extended from a diameter of the diverging section.

8. The arrangement of claim 1, further including a second converging-diverging nozzle positioned axially downstream of the first nozzle, for fractioning of gas mixtures into components having different dew points.

9. The arrangement of claim 1, wherein said vortex chamber defines a profiled annular portion positioned about the chamber axis between said first and second disc shaped parts and downstream of said turn and in fluid communication with each of said spiral inlet portion and said spiral outlet portion, the annular portion having sidewalls that converge toward the chamber axis at the nozzle throat and then, from the nozzle throat, diverge to the second disc shaped part.

10. The arrangement of claim 9, wherein an axial distance from said first axial position to said nozzle throat is less than a diameter of said annular portion at said nozzle throat, and wherein an axial length of a converging portion of said nozzle upstream of the nozzle throat is less than an axial length of a diverging portion of said nozzle downstream of the nozzle throat.

11. The arrangement of claim 9, wherein said annular portion and said sidewalls thereof consist of a converging portion immediately followed by a diverging portion and wherein said annular portion defines an unobstructed circular flow-through cross section from, and including, said converging portion to, and including, said diverging portion, such that gas flow accelerates to supersonic swirl flow velocity proximate the nozzle throat with subsonic axial velocity.

* * * * *